May 30, 1933.   R. A. BYRD   1,911,349
CULTIVATOR ATTACHMENT
Filed June 20, 1932
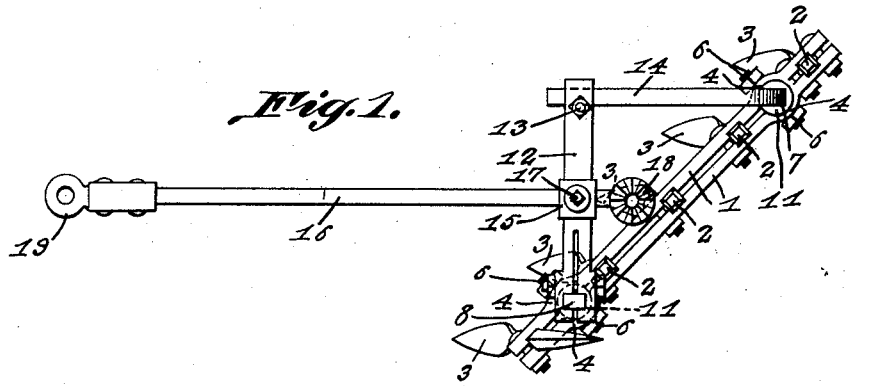
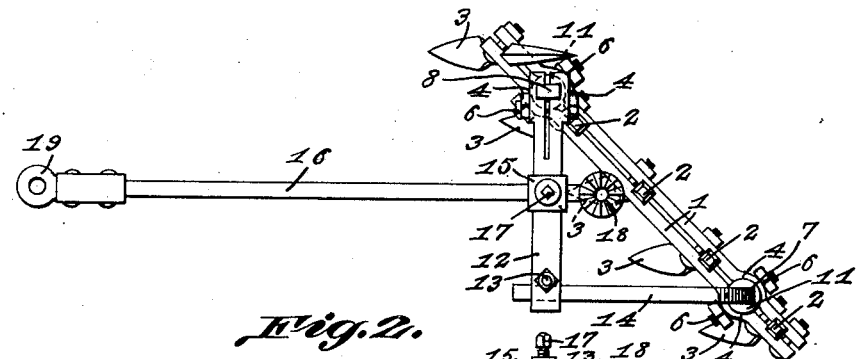
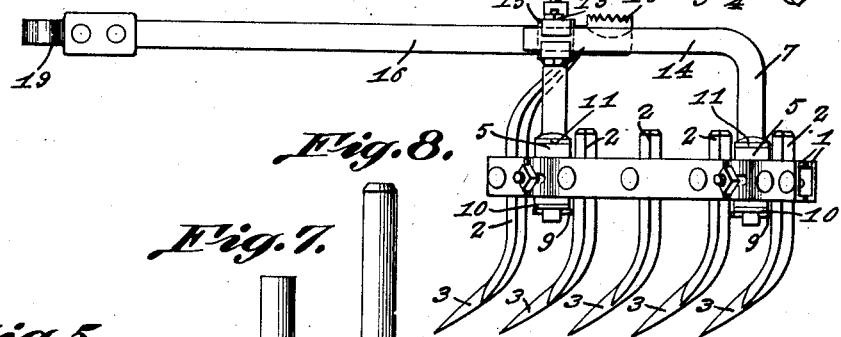
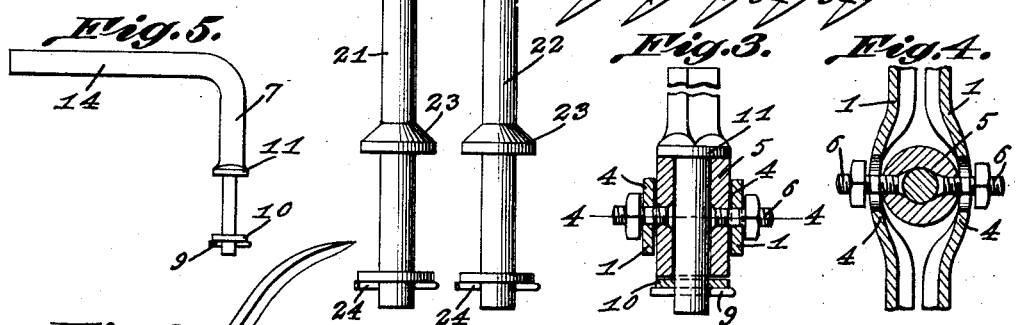
Raleigh A. Byrd, INVENTOR
BY Victor J. Evans & Co.
ATTORNEY Patented May 30, 1933

1,911,349

UNITED STATES PATENT OFFICE

RALEIGH A. BYRD, OF ALAMO, TENNESSEE

CULTIVATOR ATTACHMENT

Application filed June 20, 1932. Serial No. 618,311.

This invention relates to agricultural implements and its general object is to provide a cultivator attachment in the form of a harrow and scraper that is capable of being detachably secured to practically all types of cultivator frames now in general use in an easy and expeditious manner and with minimum change of parts.

A further object of the invention is to provide a double cultivator attachment of the character set forth, that includes teeth or plow shovels arranged in gangs that are adjustable in accordance with the width of the row of the crops to be cultivated and the teeth are adjustable for deep or shallow plowing.

Another object of the invention is to provide a cultivator attachment that includes reversible teeth for plowing crops of various kinds and growth.

A still further object of the invention is to provide a cultivator attachment that is capable of being used in plowing or harrowing growth laden ground with minimum clogging of the attachment with weeds and the like.

Another object of the invention is to provide a cultivator attachment that is strong and sturdy, and is capable of use in plowing or harrowing stump laden ground, without fear of damaging the parts, due to the flexibility of the attachment.

A further object of the invention is to provide a cultivator attachment that is easy to assemble, simple in construction, inexpensive to manufacture, and extremely efficient in operation and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:—

Figure 1 is a top plan view illustrating the cooperative arrangement of the double attachment which forms the subject matter of the present invention.

Figure 2 is a side elevation of one of the attachments.

Figure 3 is a sectional view taken through the frame for the teeth and illustrates the manner of securing the frame shanks to the frame.

Figure 4 is a sectional view taken approximately on line 4—4 of Figure 3.

Figure 5 is a detail view of one of the frame shanks.

Figure 6 is a detail view of the front tooth or plow shovel.

Figures 7 and 8 are detail views of modified forms of frame shanks.

Referring to the drawing, in detail, it will be noted from Figure 1 that I have illustrated the attachments arranged as used with a cultivator frame and each of the attachments includes a frame for carrying teeth, which is made up of a pair of cooperating channel iron members 1 of like construction, with their channel portions disposed in face to face relation as best shown in Figure 2. The top and bottom walls of the channel iron members are recessed to provide seats for the shanks 2 of the teeth or harrow shovels 3. While I have illustrated five teeth in each gang, I want it understood that any number of teeth may be employed without departing from the spirit of the invention. The front tooth of each gang is double pointed and is provided with one flattened end, and its opposite end is tapered and terminates in a ground penetrating point as best shown in Figure 6. The remaining teeth have flattened ground engaging portions similar to the flattened portion of the front tooth of each gang.

The channel iron members are rounded adjacent their ends to provide bearings 4, for sleeves 5 and these bearings 4 are slotted horizontally for the purpose of accommodating bolts 6 which pass through the slots as well as through the sleeves 5 which have the heads of the bolts 6 countersunk therein as clearly shown in Figure 3, with the result the teeth carrying frames are mounted for adjustment at angles with respect to each other in a horizontal plane. The bolts are provided with nuts that cooperate therewith for securing the frames in adjusted positions and the frames are provided with bolt and nut connections for securing the channel iron members in cooperative relation with respect to each other as well as the shanks of the teeth in their seats, as clearly shown in Figures 1 and 2.

Mounted for movement in the sleeves 5 are the reduced lower ends of frame shanks 7 and 8 and these reduced ends are held in the sleeves 5 through the instrumentality of cotter pins 9 that engage washers 10, and the shoulders 11 that are provided by the reduced lower ends engage the upper ends of the sleeves as indicated in Figure 3.

By loosely mounting the frame shanks in the sleeves, it will be obvious that the frames are movable so as to provide a certain amount of flexibility so that the parts will give when the teeth contact obstructions, whereby the liability of damaging or breaking the parts is reduced to a minimum.

The particular tooth construction and the construction of the frame, has a tendency to prevent the parts from becoming clogged with weeds and foreign matter, and by providing a front tooth with reversible ground penetrating ends, it will be apparent that either end can be used, it depending upon the kind and growth of the crops. The shovel end of the reversible tooth is used for cultivating large and well grown crops, while the small or tapered end is used for cultivating small or sprouting crops.

The teeth frames are arranged in converging relation with respect to each other as shown in Figure 1, and held accordingly through the instrumentality of cross heads 12, there being one cross head for each frame and each cross head is split longitudinally from the ends thereof and provided with recesses upon opposite sides of the slits to form seats to receive the frame shanks 7 and 8 that are held in the seats by bolt and nut connections 13. The frame shanks 7 include horizontal portions 14 that are square in cross section and these horizontal portions are arranged in the outer ends of the cross heads, while the frame shanks 8 are square in cross section and are received in the inner ends of the cross heads.

Secured to the cross heads through the medium of collars 15 that are mounted for slidable adjustment thereon are cultivator beams 16, and the collars are held in adjusted position by set screws 17. These cultivator beams have formed with the rear ends thereof serrated clamping disks 18 that cooperate with similar clamping disks that may be formed with handles not shown, whereby handles may be secured to the beams as will be apparent. The beams have fixed to their forward ends eyed members 19 for connection with the crank axles of the cultivator frame, not shown.

In Figures 7 and 8, I have illustrated modified forms of frame shanks which are indicated by the reference numerals 21 and 22 and these frame shanks have formed therewith or otherwise secured thereto collars 23. The portions of the frame shanks 21 and 22 below the collars 23 are adapted to be received in the sleeves 5 and held therein by cotter pins 24. The frame shanks 21 and 22 are designed for connection with cultivators that carry round shank receiving parts, as it will be noted that these frame shanks are round in cross section.

By employing frame shanks of various shapes and sizes, my attachments can be associated with practically all types of cultivator frames now in general use, and of course when the cross sectional round frame shanks are used, the cross heads, as shown and their associated part are dispensed with.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A cultivator attachment comprising a frame including a pair of cooperating channel iron members, means for securing the channel iron members with their channel portions in face to face relation, said channel iron members being recessed in a manner whereby the recesses of one channel iron member cooperate with the recesses of the other member to provide seats, teeth having shanks secured in said seats, said channel iron members being rounded adjacent their ends to provide slotted bearings, sleeves mounted in said bearings, means secured to said sleeves and arranged in said slots for adjustably securing the channel iron members with respect to the sleeves, and means for mounting the channel iron members on a cultivator, said means being secured in said sleeves to allow for movement of the frame.

In testimony whereof I affix my signature.

RALEIGH A. BYRD.